United States Patent
Li et al.

(10) Patent No.: US 9,234,138 B1
(45) Date of Patent: Jan. 12, 2016

(54) REVOLVING WASTE PLASTIC-OIL CONVERTING EQUIPMENT AND METHOD OF USING THE SAME

(71) Applicant: NANTONG TIANYI ENVIRONMENTAL ENERGY TECHNOLOGY LIMITED CORPORATION, Nantong, Jiangsu (CN)

(72) Inventors: Jianguo Li, Woodridge, IL (US); Xurong Zhao, Jiangsu (CN)

(73) Assignee: NANTONG TIANYI ENVIRONMENTAL ENERGY TECHNOLOGY LIMITED CORPORATION, Nantong, Jiangsu (CN)

( * ) Notice: Subject to any disclaimer, the term of this patent is extended or adjusted under 35 U.S.C. 154(b) by 234 days.

(21) Appl. No.: 13/861,793

(22) Filed: Apr. 12, 2013

Related U.S. Application Data

(63) Continuation-in-part of application No. 12/401,744, filed on Mar. 11, 2009, now abandoned, which is a continuation-in-part of application No. 12/211,988, filed on Sep. 17, 2008, now abandoned.

(51) Int. Cl.

| | |
|---|---|
| C10B 47/30 | (2006.01) |
| C10B 53/07 | (2006.01) |
| C10G 1/10 | (2006.01) |
| C10B 1/10 | (2006.01) |
| C10B 47/32 | (2006.01) |

(52) U.S. Cl.
CPC ... *C10G 1/10* (2013.01); *C10B 1/10* (2013.01); *C10B 47/30* (2013.01); *C10B 47/32* (2013.01); *C10B 53/07* (2013.01); *Y02P 20/143* (2015.11)

(58) Field of Classification Search
CPC ............ C10G 1/10; C10B 1/10; C10B 47/30; C10B 47/32; C10B 53/07
USPC .......... 201/2.5, 7, 33; 585/241; 202/131, 136, 202/249
See application file for complete search history.

(56) References Cited

U.S. PATENT DOCUMENTS

| | | | | |
|---|---|---|---|---|
| 157,432 | A * | 12/1874 | Van Houten | 202/136 |
| 1,748,178 | A * | 2/1930 | Hume | 202/218 |
| 1,980,828 | A * | 11/1934 | Reed et al. | 202/131 |
| 6,270,630 | B1 * | 8/2001 | Xing | 202/136 |
| 7,932,424 | B2 * | 4/2011 | Fujimoto et al. | 201/2.5 |
| 2009/0117015 | A1 * | 5/2009 | Shimo et al. | 422/184.1 |

FOREIGN PATENT DOCUMENTS

| | | | |
|---|---|---|---|
| CN | 2399389 | * | 10/2000 |
| CN | 2474537 | * | 1/2002 |

* cited by examiner

*Primary Examiner* — Jill Warden
*Assistant Examiner* — Joye L Woodard
(74) *Attorney, Agent, or Firm* — K & L Gates LLP

(57) ABSTRACT

A waste plastic to fuel oil distillation vessel is disclosed. The distillation vessel can be a revolving cone with many traverse supporting tubes therein. This structure allows high temperature air or gas to go through the support tubes, which pass through the vessel, to increase the heating area and increase the temperature of the distillation vessel. Also disclosed is a method of converting waste plastic or rubber into fuel oil.

12 Claims, 10 Drawing Sheets

IX - IX

X - X

REVOLVING WASTE PLASTIC-OIL CONVERTING EQUIPMENT AND METHOD OF USING THE SAME

CROSS REFERENCE TO RELATED APPLICATIONS

The present application is a continuation-in-part application of U.S. Ser. No. 12/401,744, filed on Mar. 11, 2009, the contents of which are expressly incorporated herein by reference and claims the priority of U.S. Ser. No. 12/211,988, filed on Sep. 17, 2008.

FIELD OF THE INVENTION

The present invention relates to the recycling of waste plastic and rubber and particularly relates to refining equipment and a method that converts waste plastic and waste rubber to fuel oil.

BACKGROUND OF THE INVENTION

With the rapid development of the plastic industry, plastic articles are becoming increasingly important in industrial production and in our daily life. More waste plastics are generated with the abundant applications of plastics. Due to the fact that the waste plastics are almost non-decomposable in natural condition, they become a serious problem to the survival of our environment. As such, it becomes very important to solve the pollution problem in our environment caused by the waste plastics, and to get them recycled and re-used.

SUMMARY OF THE INVENTION

In a preferred embodiment, the present invention is directed to a vessel for converting waste plastic or rubber into fuel oil. The reaction vessel includes a wall extending between a first and a second end. Preferably, the wall is cylindrically or cone shaped. The diameter of the first end is about 1.6-2.3 meters, the diameter of the second end is 1.8-2.5 meters, the length is 8.0-10.0 meters, and the slope is about 1-1.5%. The second end of the vessel can have a diameter of up to 144 inches, although larger sized diameters are contemplated depending upon the needs of the user. The heads of the vessel are hemispherical. The material of the cone shaped body of the vessel and the heads is high temperature heat resistant. The vessel can continually rotate for 100,000 hours under 350-650° C., such as 350-400° C. or 594-650° C., without thermal failure.

The vessel further includes a feed-in entrance protruding through the first end, a residue discharge outlet protruding through the second end, and an oil or gas output tube protruding through the second end. Hereinafter, the oil or gas output tube may be interchangeably referred to as a fuel output tube.

The feed-in entrance protrudes through the first end of the reaction vessel to make the waste material go directly into the heating area of the vessel and make the feed-in entrance easy to be connected with the wall of the reaction vessel by triangular reinforcing ribs. The protruding length is about 120-180 mm. Preferably, the protruding part of the feed-in entrance is 150 mm long.

The residue discharging outlet protrudes through the second end of the vessel to directly discharge the residue from the vessel, and to make the discharge outlet easy to be connected with the wall of the reaction vessel by triangular reinforcing ribs. The protruding length is 120-180 mm. In one embodiment, the protruding part of the discharging outlet is 150 mm long.

The feed-in entrance and the oil or gas output tube can be situated on first and second support bearings, respectively. In certain aspects, a filter can be included in or at an end of the oil or gas output tube. Inside of the reaction vessel there is a shield in front of the oil or gas output tube and a helix thruster housed inside of the oil or gas output tube. Furthermore, there is a plurality of supporting tubes housed inside of the reaction vessel wherein the supporting tubes protrude through the wall of the vessel and open out so that heated air or gas can flow therethrough. A heater can be provided to facilitate the heating of the vessel and the supporting tubes. The vessel may be housed inside of a kiln structure including a heat insulation wall. Air or gas inside of the kiln structure is heated to a temperature of up to 800° C., thereby flowing through the supporting tubes and heating the supporting tubes and vessel.

The vessel, feed-in entrance, oil or gas output tube, supporting tubes and residue discharge outlet can be made from an alloy steel, seamless steel, iron, and the like.

The supporting tubes can be arranged vertically, horizontally, diagonally and combinations thereof inside of the vessel. Moreover, the supporting tubes can have a diameter of up to 200 mm, although larger sized diameters are contemplated depending upon the needs of the user.

The inside of the vessel can achieve an operating temperature of up to 450° C. and the vessel can have a length of up to 24 feet. To achieve this operating temperature, the vessel and supporting tubes may be heated via hot air or gas.

The vessel can have the ability to continuously rotate, preferably about the center longitudinal axis, during operation. A motor, which supplies power and facilitates rotation of a first and a second gear, supplies the power to rotate the vessel. The second gear is provided on the vessel, preferably the feed-in entrance comprises the second gear, whereby rotation of the first and second gears allows rotation of the vessel.

Because of the instant cracking of the feed-in waste material, there may be a lot of solid carbide present in the reaction vessel near the feed-in end. In order for the material to be more completely cracked, and to more easily discharge the solid residue, the solid carbide preferably needs to be ground to smaller sizes. To keep the big solid carbide from moving to the discharging end of the reaction vessel before being ground, there is a 3-4 mm thick circular grille installed inside the first part of the reaction vessel near the feed-in end. The grille is preferably radically directionally fixed on the wall of the vessel. Preferably there are 30 mm holes in the grille to filter the solid carbide. To grind the solid carbide, some steel balls are placed in front of the grille in the reaction vessel. The balls in front of the grille rotate with the rotation of the reaction vessel and act as grindstones. In doing this, the size of the solid carbide is reduced, so that the solid carbide can go through the grille and therefore, can be more easily discharged out of the reaction vessel. The number of the steel balls may be 40-60 with diameters of about 30-50 mm. In one embodiment, there are 50 balls with diameters of about 40 mm.

In order to make the chemical conversion of the waste material more complete and efficient, at least two layers of removable catalyst trays are installed in the reaction vessel. In doing so, the pyrolysis gases go through the catalyst trays for further catalytic cracking. Each layer is held by a pair of iron angles fixed on the inside wall of the vessel and against the supporting tubes. The tray may be 50 mm deep, and 75%-80% of the tray area may be filled with catalyst held in the tray by stainless steel meshes. The catalysts may be solid spherical particles or strips and sized to be about 30-50 mm so that the solid spherical particles or strips are easily held in the tray by the stainless steel meshes. The remaining 20%-25% of the tray area may be empty space that allows the cracked gas to go through without blocking. The pyrolysis gases go through the catalyst trays for further catalytic cracking, so that the chemical conversion of the waste material is more complete and efficient. In doing so, the productivity is enhanced, and emissions are reduced.

Also, an embodiment of the present invention provides a discharging system for discharging residue from the vessel. The discharging system can include a first residue discharging system housed inside of the vessel. The residue discharge outlet protruding through the wall of the vessel can include a flange which can be connected to and disconnected from a first tube. The first tube can be connected to a second tube and the second tube may be further be connected to a residue storage tank.

In certain embodiments, the discharging system can include a second residue discharging system housed inside of the second tube, and a closed residue discharging channel can be formed between the first residue discharging system and the second residue discharging system.

The first residue discharging system can include a three shaft conveyor system including a driver shaft and a first and second driven shaft wherein each shaft can be supported by one or more sliding bearings. Moreover, the driver shaft can further include a spiral vane disposed thereon and the first and second driven shafts can each further include a residue collecting vane disposed thereon. The driver shaft or one of the driven shafts can extend from inside of the vessel to an inside of the residue discharge outlet. Furthermore, the second residue discharging system can include a single driver shaft conveyor system supported by one or more bearings and have a spiral vane disposed thereon.

A preferred embodiment of the present invention also provides a method of converting waste plastic or rubber into fuel oil. The method can include the steps of providing a device including a reaction vessel having a wall extending between a first end and a second end of the vessel, preferably a cone shaped or cylindrically shaped wall. The method may include the step of housing the reaction vessel inside of a kiln including a heat insulation wall. The method can also include the steps of providing a feed-in entrance protruding through the first end of the reaction vessel and situated on a first support bearing, providing a residue discharge outlet protruding through the second end of the reaction vessel and providing an oil or gas output tube protruding through the second end of the reaction vessel and situated on a second support bearing. The method can also include the steps of providing a shield housed inside of the reaction vessel in front of the oil or gas output tube, providing a helix thruster housed inside of the oil or gas output tube, providing a heater, and providing a plurality of supporting tubes housed inside of the reaction vessel wherein the supporting tubes protrude through the wall of the reaction vessel and open out.

A motor may be provided and activated whereby the motor facilitates rotation of a first and a second gear. The second gear can be provided on the reaction vessel, preferably the feed-in entrance comprises the second gear, causing the reaction vessel to rotate, preferably about the center longitudinal axis. The method further can include the steps of heating the vessel and supporting tubes and feeding waste plastic, rubber, a catalyst, or any combination thereof through the feed-in entrance while heating the reaction vessel and the supporting tubes. The outside of the supporting tubes and vessel can be heated to an operating temperature of up to 800° C. and the inside of the vessel can achieve an operating temperature of up to 450° C. Heating the supporting tubes and vessel facilitates the next step of vaporizing the waste plastic or rubber to produce waste plastic or waste rubber vapor whereby during rotation of the vessel, the waste plastic or rubber vapor flows through the oil or gas output tube. A further step of the method of converting waste plastic or rubber into fuel oil can include condensing the waste plastic or rubber vapor in a condenser to form a condensate. Transmitting the condensate from the condenser through an oil-water separator to obtain an oil phase product and bringing the oil phase product into a mixing tank are other steps that can be included in the present method. Moreover, a catalyst can be added to the mixing tank to improve the stability of the oil phase product against oxidation. Yet another step according to the present method can include refining the oil phase product to produce gasoline, diesel oil, and other hydrocarbon fractions.

The preferred embodiments of the invention will now be described in greater detail with reference to the accompanying drawing figures.

BRIEF DESCRIPTION OF THE DRAWING FIGURES

DETAILED DESCRIPTION OF THE PREFERRED EMBODIMENTS

The following description concerns preferred embodiments of the waste plastic to fuel oil converting distillation vessel. The waste plastic to fuel oil converting distillation vessel disclosed herein can be interchangeably referred to as a vessel, reactor, distillation vessel, reaction vessel, or the like.

Figure 1:
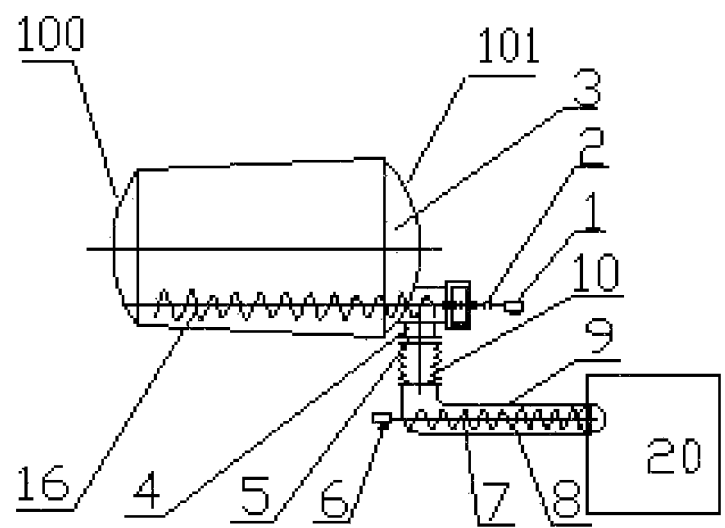
FIG. 1 is a side view of the revolving waste plastic-oil converting equipment and discharging system according to an embodiment of the present invention.

As shown in FIG. 1, a preferred embodiment of the present invention includes a reaction vessel 3. The reaction vessel 3 has a wall, preferably a cone-shaped wall or a cylindrically shaped wall, which makes up its body. The wall extends between a first 100 and a second end 101 of the vessel and the vessel 3 has a total length of up to 24 feet, preferably about 15-21 feet. The first and second ends 100 and 101 of the vessel can be configured to any suitable operating diameters although in a preferred embodiment, the diameter of the second end is in a range of from about 72-144 inches. Furthermore, the reaction vessel 3 can be made from any suitable material that can handle the high temperatures that the vessel is exposed to, such as iron, alloy steel, and the like. The reaction vessel 3 may also be housed inside of a kiln structure 27 (shown in FIGS. 5 and 6).

Figure 7:
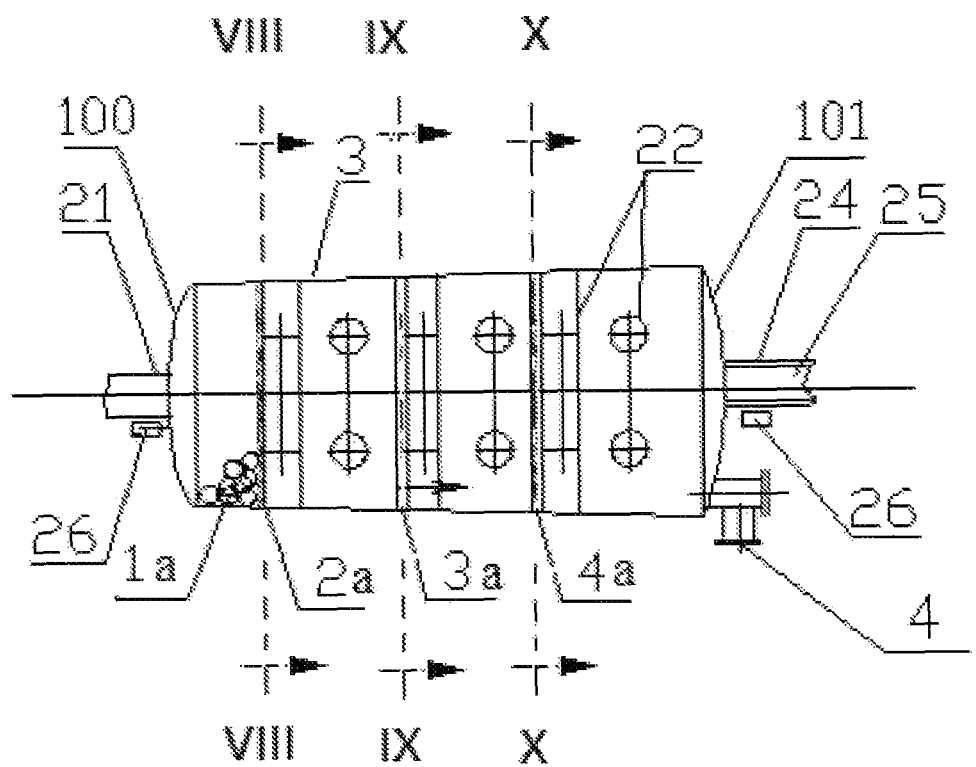
FIG. 7 is a side view of a reaction vessel according to an embodiment of the present invention.
Figure 8:
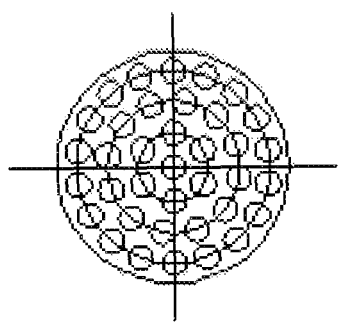
FIG. 8 is a sectional view along line VIII-VIII as shown in FIG. 7.

FIG. 7 shows a reaction vessel. The reaction vessel is shown having a 3-4 mm thick circular grille 2a installed inside the first part of the reaction vessel 3 near the feed-in entrance 21. The grille 2a is radically directionally fixed on the wall of the reaction vessel 3. FIG. 8 shows a sectional view of the grille 2a along line VIII-VIII as shown in FIG. 7. There may be 30 mm holes in the grille to filter any solid carbide produced during the reaction. To grind the solid carbide, grinding bodies, such as some steel balls, ceramic balls, rocks, are placed between the first feed-in entrance 21 of the reaction vessel 3 and the grille 2a in the reaction vessel 3. Grinding bodies are formed in at least one of the shapes comprising a cylinder, a disk, a cube, a prism, a cuboid, a polyhedron, a ball, a spherical segment, an ellipsoid, a tetrahedron, and any combination thereof. The ball embodiment of the grinding bodies can be made of material selected from the group consisting of metals, alloys, and ceramics. One preferred embodiment is that ball embodiment of the grinding bodies is steel. The balls rotate in accordance with the rotation of the reaction vessel 3 and have a grinding function, like a grindstone. In doing this, the size of the solid carbide is reduced, so that the smaller sized carbide goes through the grille 2a and therefore, gets out of the reaction vessel 3 through the discharging system more easily. The number of the steel balls may be 40-60, and the diameter of the balls may be 30-50 mm. In one embodiment, there are about 50 balls with 40 mm diameters.

Figure 9:
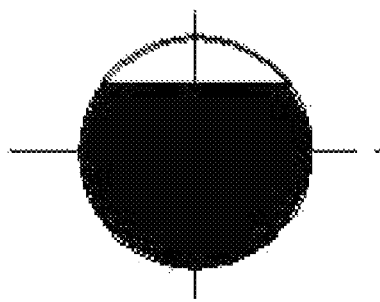
FIG. 9 is a sectional view along line IX-IX as shown in FIG. 7.
Figure 10:
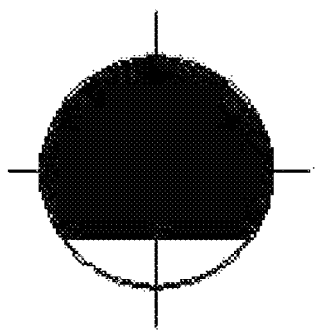
FIG. 10 is a sectional view along line X-X as shown in FIG. 7.

As shown in FIG. 7, in order to make the chemical conversion of the waste material more complete and efficient, at least two layers of removable catalyst trays 3a and 4a are installed in the reaction vessel 3. FIG. 9 shows the cross sectional view of catalyst tray 3a along line IX-IX as shown in FIG. 7. FIG. 10 shows the cross sectional view of catalyst 4a along line X-X as shown in FIG. 7. The pyrolysis gases go through the catalyst trays 3a and 4a for further catalytic cracking. Each layer is held by a pair of iron angles fixed on the inside wall of the reaction vessel 3 and against the supporting tubes 22. The distance between the two walls of each tray can be about 50 mm, and about 75%-80% of the tray is filled with catalyst held in the tray by stainless steel meshes. The catalysts may be solid spherical particles or strips, and sized to be about 30-50 mm which is easily held in the tray by the stainless steel meshes. The remaining 20%-25% of the tray area may be empty space that allows the cracked gas to pass through without being blocked. The pyrolysis gases go through the catalyst trays for further catalytic cracking, so that the chemical conversion of the waste material is more complete and efficient.

Figure 3:
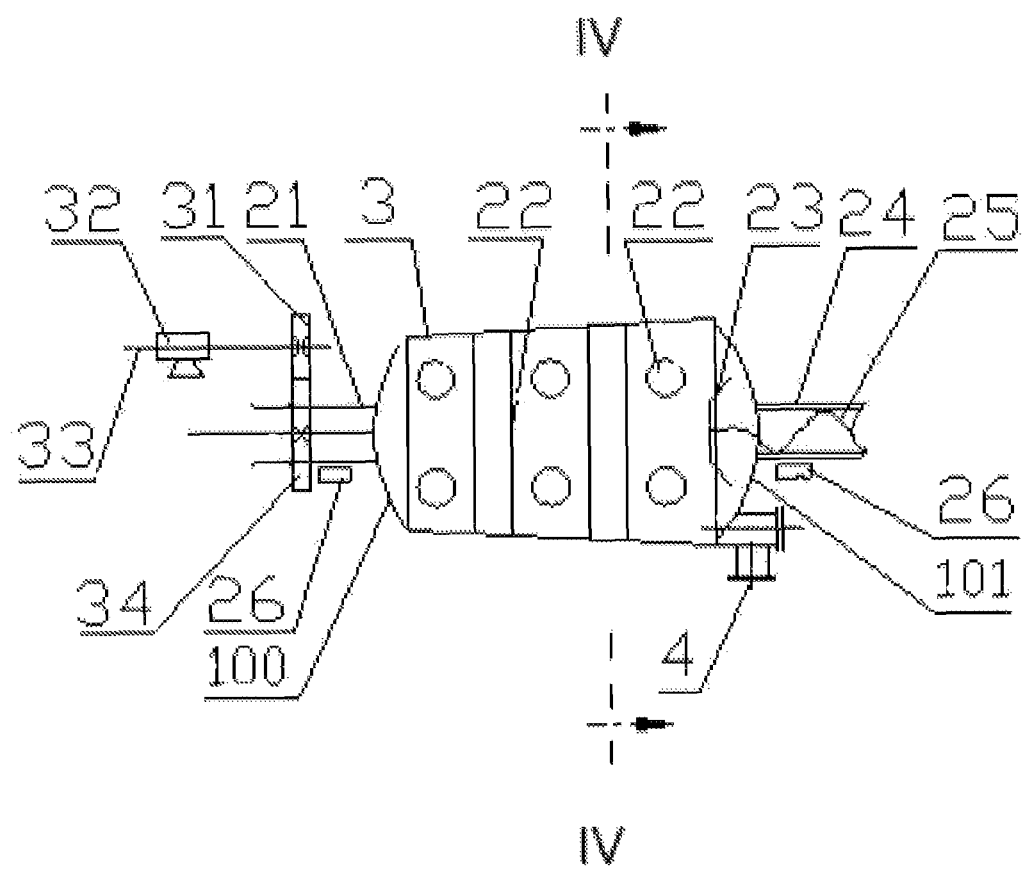
FIG. 3 is a cross-sectional side view of a reactor.
Figure 4:
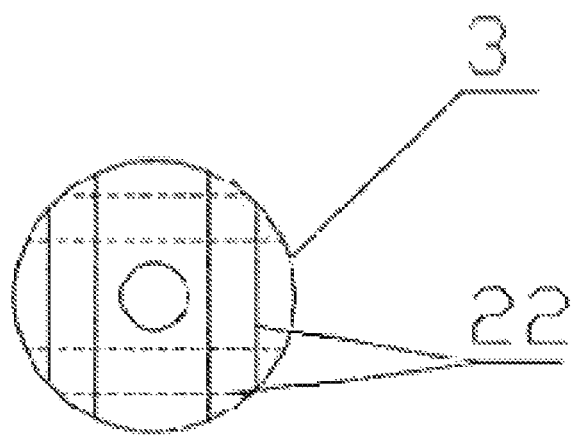
FIG. 4 is a sectional view along line IV-IV as shown in FIG. 3.

FIG. 3 shows a feed-in entrance 21 protruding through the first end 100 of the reaction vessel 3. The feed-in entrance 21 can be connected to an automatic hydraulic feeder (not shown) or any other known method to perform feeding or continuous feeding of the waste plastic or rubber. Moreover, the feed-in entrance 21 can be situated on or engaged with, and supported by, a support bearing 26. At the second end 101 of the reaction vessel 3, a residue discharge outlet 4 is shown protruding therethrough. The residue discharge outlet 4 can also be referred to as a curved tube. An oil or gas output tube 24 is also shown protruding through the second end of the vessel 3. The oil or gas output tube 24 or fuel output tube 24 can have a helix thruster 25 and a filter (not shown) disposed therein. Also, the oil or gas output tube 24 can be situated on or engaged with, and supported by, a support bearing 26. A shield 23 is placed inside of the vessel 3 near an entrance of the oil or gas output tube 24 to block unwanted residue from escaping through this tube. If the unwanted residue were to get into the oil or gas output tube 24, the helix thruster 25 set in the tube can push the residue back into the vessel 3. The shield 23, feed-in entrance 21, residue discharge outlet 4, oil or gas output tube 24, helix thruster 25, and support bearings 26 can be made from any suitable materials that can handle the operating temperatures of the vessel 3, such as iron, an alloy steel, and the like.

A plurality of supporting tubes 22 are housed inside of the reaction vessel 3 wherein the supporting tubes 22 protrude through the wall of the reaction vessel 3 and open out. These supporting tubes 22 can be arranged horizontally, vertically, diagonally, and any combination thereof inside of the vessel 3. The quantity of supporting tubes 22 used depends upon the length of the reaction vessel 3 where a longer vessel 3 could require more supporting tubes 22. Each end of the supporting tubes 22 goes through the vessel wall and opens out so heated air or gas can be supplied therethrough. That is, ends of the tubes may be open outside of the vessel, and the tubes are not in fluid communication with each other. When the vessel 3 is housed inside of a kiln structure 27, the air or gas inside of the kiln 27 is heated and in turn, heats the vessel and flows through the open ends of the supporting tubes 22 to heat them as well. With the supporting tubes 22 going through the vessel 3, the waste plastic or rubber therein is evenly heated and the reaction vessel 3 is capable of achieving much higher operating temperatures than a vessel 3 not including the supporting tubes 22. The supporting tubes 22 can have any suitable diameter, preferably a diameter of up to 200 mm, and be made from any material that can withstand the operating temperatures that the vessel 3 is exposed to such as seamless steel, an alloy steel, iron, and the like.

As a result of the placement of the supporting tubes 22 inside of the reaction vessel 3, the strength of the vessel 3 is greatly improved. Due to the high temperatures that can be achieved inside of the vessel 3, such as 450° C., and outside of the vessel 3, such as 800° C., the shape of the vessel 3 could easily become distorted as it does with the vessels in the prior art. However, the vessel 3 of the present invention is not subjected to the shape distortion problems associated with the prior art reaction vessels at least because of the supporting tubes 22 of the present invention. Also due to the supporting tubes 22, the first and second ends of the vessel 3 can have a much larger diameter than those found in the prior art so the vessel is capable of handling the demand of large-scale manufacturing. Moreover, the life of the vessel 3 is greatly increased due to the supporting tubes 22. Finally, the supporting tubes 22 allow the waste plastic or rubber to be heated evenly inside of the vessel 3, which causes a complete reaction of all of the waste plastic or rubber into vapor.

In a preferred embodiment of the present invention, the reaction vessel 3 further includes a rotation mechanism. The rotation mechanism allows the vessel 3 to continuously rotate, preferably about the center longitudinal axis, during operation. The rotation mechanism can include a motor that supplies power and facilitates rotation of a first and a second gear (not shown), whereby rotation of the first and second gears allows rotation of the vessel 3. In a preferred embodiment, the second gear is provided on the vessel 3, preferably the feed-in entrance 21 comprises the second gear, so that rotation of the first and second gears facilitates rotation of the reaction vessel 3. Although the rotation mechanism can comprise a motor, and a first and second gear, various other rotation mechanisms can be used, such as pulleys, magnets and the like, in accordance with the present invention as is commonly known by those skilled in the art.

The vessel 3 of the present invention can be used in a method of converting waste plastic or rubber into fuel oil. The method may include any or all of the following steps, not necessarily in the order as described. A motor is activated whereby the motor facilitates rotation of a first and a second gear, wherein the second gear is provided on the reaction vessel 3, causing the reaction vessel 3 to rotate. Waste plastic or rubber and a catalyst are then manually or automatically fed through the feed-in entrance 21. The catalyst can be alumina based, silicon dioxide based, or any other catalyst useful in method of converting waste plastic or rubber into fuel oil. The reaction vessel 3 and the supporting tubes 22 are then heated. An operating temperature of up to 800° C., and preferably about 700° C., can be achieved outside of the vessel 3. Moreover, the inside of the vessel can be heated to a temperature of about 400° C. to 450° C. Such a high operating temperature inside of the vessel 3 is attributable to the supporting tubes 22 incorporated in the vessel 3, and a vessel not including these supporting tubes 22 would not be capable of achieving such high temperatures.

The waste plastic or rubber is then transformed from a solid to a liquid state with the increasing temperature. The liquid is then converted into a gas or vapor phase under the action of the catalyst and the waste plastic or rubber vapor flows through the oil or gas output tube 24 and exits the vessel 3. This vapor is then condensed into a mixture of liquid hydrocarbons in a condenser (not shown), before which the dust impurities carried by the vapor are separated in a settler (not shown). The condensate is then transmitted from the condenser through an oil-water separator (not shown) to obtain an oil phase product. The oil phase product is then brought into a mixing tank (not shown) and the catalyst is added to the mixing tank to improve the stability of the oil phase product against oxidation. Finally, the oil phase product is refined to produce gasoline, diesel oil, or other hydrocarbon fractions.

A preferred embodiment of the vessel 3 incorporating a continuous residue discharging system will now be described. With respect to FIG. 2, a high temperature, separable, continuous residue discharging system includes two sub-systems: a first residue discharging system and a second residue discharging system. The first residue discharging system is assembled in a reactor 3. The reactor 3 can be any type of reactor that converts plastic, rubber, industrial waste or the like into oil, fuel, or the like. The first residue discharging system is a three unilateral shaft conveyer system. However, the system may include only one shaft or any number of shafts depending on the diameter of the shafts and the size of the reactor that the shafts are housed inside of. In the embodiment shown in FIG. 2, the driver shaft 16 of the conveyor system extends the length of the reactor 3 and further into a residue discharge outlet or curved tube 4 (as shown in FIG. 1). A spiral vane 17 is disposed on the driver shaft 16.

The curved tube 4 includes a flange 5, which connects the curved tube 4 to a first tube 10. The first tube 10 has the ability to retract from the connection with the curved tube 4. Also shown in FIG. 1 is the first tube 10 as it connects to the second tube 9. In a preferred embodiment, the second tube 9 is made of steel and has a diameter of 325 mm but this tube can be made from a variety of materials known in the art and include a large range of diameter sizes. Furthermore, the second tube 9 can be an integral, single body tube or it can comprise multiple segments that are connected together to form a pathway. The second tube 9 is further attached to a residue storage tank 20. The connection of the curved tube 4 by its flange 5 to the first tube 10, the first tube 10 to the second tube 9, and the second tube 9 to the residue storage tank 20 forms a closed residue discharging channel.

Housed inside of the second tube 9 is a second residue discharging system. As shown in FIG. 1, the second residue discharging system includes a single driver shaft 7 with a spiral vane 8 disposed thereon. The spiral vane 8 can be located in between a pair of bearing components (not shown), which support the single driver shaft 7 and allow it to rotate smoothly. However, in other embodiments, the second residue discharging system can include any number of shafts.

Figure 2:
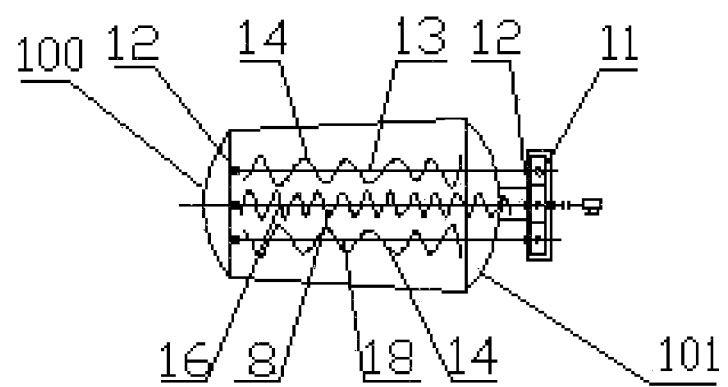
FIG. 2 is a cross-sectional top view of a reactor incorporating a preferred embodiment of the first residue discharging system of the present invention.

Also depicted in FIGS. 1 and 2 are the sources used to power the system. A first power source 1 delivers power, through a clutch 2, to the driver shaft 16 of the first residue discharging system. The second power source 6 is also shown. This power source delivers power to the single driver shaft 7 of the second residue discharging system. The power sources 1,6 can include an engine and a decelerator.

As shown in FIG. 1, a preferred embodiment of the first residue discharging system includes a three unilateral shaft conveyor system housed in a reactor 3. The driver shaft 16 is shown as well as a first driven shaft 13 and a second driven shaft 18. The first and second driven shafts 13,18 include residue collecting vanes 14 disposed thereon. The driver shaft 16 includes a spiral vane 8 disposed thereon. These vanes 8,14 assist in the residue collection and conveying process by moving the residue from the reactor 3 into the curved tube 4. The shafts 13,16,18 of the first residue discharging system are supported at both of their ends by bearing components 12. The bearing components 12 allow for smooth rotation of each shaft 13,16,18. Also shown (but not labeled) is the curved tube 4 and the driver shaft 16 is extending therethrough. The driver shaft 16 includes a driver gear that is engaged with a first gear of the first driven shaft 13 and a second gear of the second driven shaft 18. All of these gears are housed inside of a gear case 11.

While the reaction vessel 3 is still at extremely high operating temperatures, the closed residue discharging channel can be formed as previously described and the residue can be discharged from the vessel 3. Accordingly, as shown in FIGS. 1 and 2, the first tube 10 is connected to the flange 5 on the curved tube 4. The first power source 1 is activated and transfers power, through the clutch 2, to the driver shaft 16. The second power source 6 is also activated and it transfers power to the single driver shaft 7. As power is transferred to these shafts 7,16 they begin to rotate. Rotation is smooth because the shafts 7,16 are supported on bearing components 12. As the driver shaft 16 begins to rotate, its driver gear rotates causing the first and second gears of the first and second driven shafts 13,18 to rotate, which in turn, causes the first and second driven shafts 13,18 to rotate. The residue collecting vanes 14 disposed on the first and second driven shafts 13,18 and the spiral vane 8 disposed on the driver shaft 16 collect residue from inside of the reactor 3 and as rotation of the vanes 8,14 occurs, residue is pushed or conveyed towards the curved tube 4. Since the driver shaft 16 and the spiral vane 8 disposed thereon extend through the curved tube 4, the residue is pushed into the curved tube and falls down, through the first tube 10 and into the second tube 9. Once the residue falls into the second tube 9, the spiral vane 8 on the rotating single driver shaft 7 begins to push or convey the residue towards the residue storage tank 20. Once all of the high temperature, combustible residue has been transferred from the reactor 3 to the residue storage tank 20, the power sources 1,6 are deactivated, the clutch 2 is disengaged which will disconnect the first power source 1 and the driver shaft 16, and the first tube 10 is retracted from the flange 5.

Figure 5:
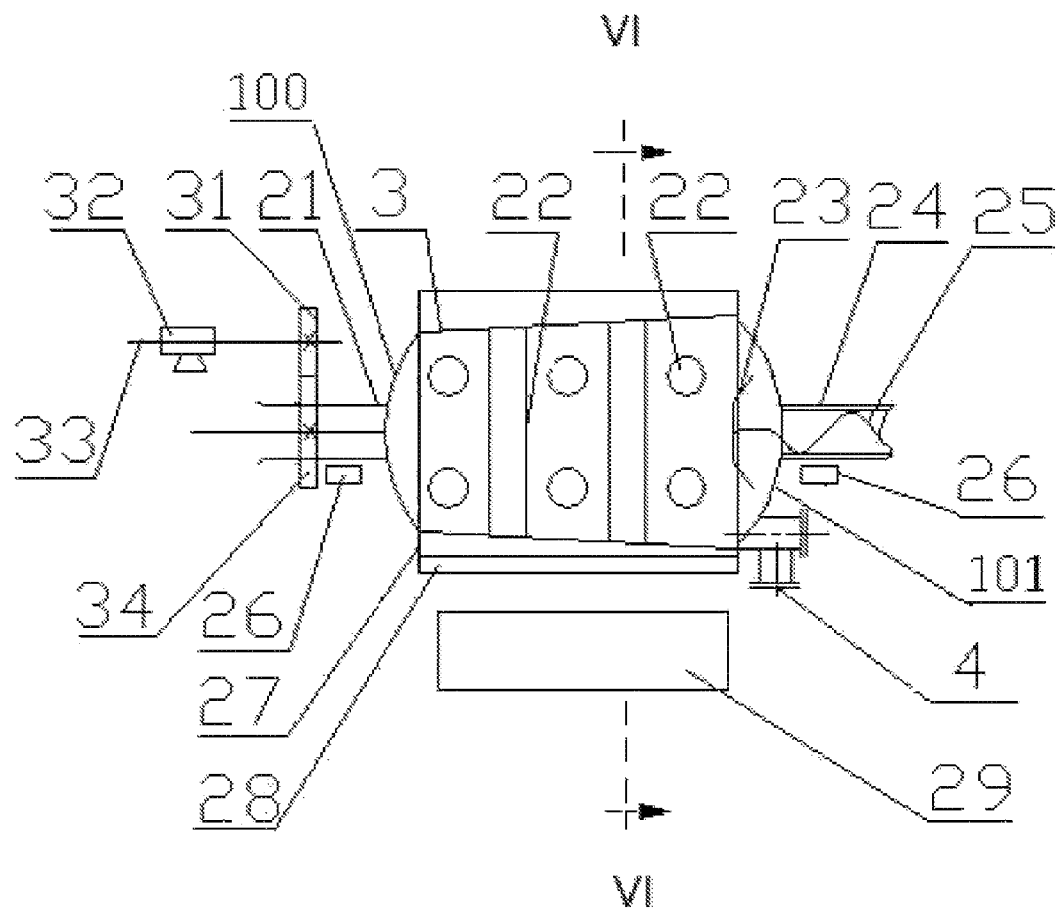
FIG. 5 is a cross-sectional side view of a reactor according to a preferred embodiment of the present invention.

FIG. 5 shows a preferred embodiment of the present invention wherein the reactor 3 is housed inside of a kiln 27. Under the reactor 3 and inside the kiln 27 is a heat insulation wall 28. The heated air inside of the kiln 27 can circulate around the reactor 3 and evenly heat it. The kiln 27 and heat insulation wall 28 can be made of fire brick. The heater 29 is also shown in FIG. 5. The heater 29 heats the air or gas inside of the kiln 27 and, in turn, heats the vessel 3 and supporting tubes 22. However, in an embodiment that does not include a kiln 27, the heater 29 simply heats the vessel 3 and supporting tubes 22. The heater 29 may operate by the combustion of a fuel, such as fuel oil or natural gas. It should be understood that other heaters commonly known in the art, such as an electric heater, can be used to heat the reaction vessel and supporting tubes.

Figure 6:
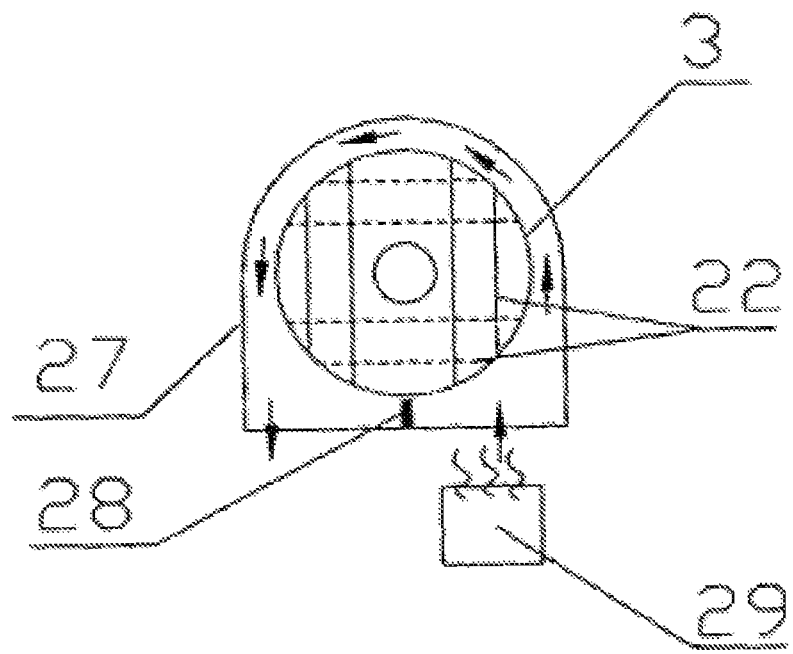
FIG. 6 is a sectional view along line VI-VI as shown in FIG. 5.

Depicted in FIG. 6 is the reactor 3 housed inside of the kiln 27. The heater 29 heats the air or gas inside of the kiln 27. In turn, the reactor 3, supporting tubes 22, and the heat insulation wall 28 are heated. The heated air or gas can circulate around the reactor 3 as shown by the arrows in FIG. 6 and also flow through the supporting tubes 22.

From the foregoing, it is believed that one of skill in the art will readily recognize and appreciate the novel advancement of this invention over the prior art and will understand that while the same has been described herein and associated with preferred illustrated embodiments thereof, the same is nevertheless susceptible to variation, modification and substitution of equivalents without departing from the spirit and scope of the invention which is intended to be unlimited by the foregoing except as may appear in the following appended claims.

What is claimed is:

1. A device for converting waste plastic or rubber into fuel oil, the device comprising:
    a cone shape vessel having a wall extending between a first end and a second end of the vessel, a grille with holes fixed on the wall within the vessel, and at least one catalyst tray positioned within the vessel and between the grille and the second end of the vessel;
    a feed-in entrance protruding through the first end of the vessel;
    a fuel output tube protruding through the second end of the vessel; and
    a plurality of hollow supporting tubes protruding through the vessel, wherein ends of the tubes are open outside of the vessel and configured to receive heated gas or air therethrough, and the tubes are not in fluid communication with each other.

2. The device of claim 1, further comprising balls located in the vessel between the grille and the first end of the vessel.

3. The device of claim 1, further comprising a residue discharge outlet protruding through the second end of the vessel.

4. The device of claim 1, further comprising a kiln in which the vessel is housed.

5. The device of claim 1, wherein the cone shaped vessel comprises a rotation mechanism allowing the vessel to continuously rotate.

6. The device of claim 1, further comprising a first support bearing on which the feed-in entrance is supported.

7. The device of claim 1, wherein the supporting tubes are arranged in a manner selected from the group consisting of vertically, horizontally, diagonally, and any combination thereof.

8. The device of claim 1, further comprising a shield housed inside of the vessel in front of the fuel output tube.

9. The device of claim 1, further comprising a second support bearing on which the fuel output tube is supported.

10. The device of claim 1, further comprising a helix thruster housed inside of the fuel output tube.

11. A method of converting waste plastic or rubber into fuel oil comprising the steps of:
    providing a device of claim 1;
    rotating the vessel;
    feeding waste plastic and/or rubber and a catalyst through the feed-in entrance;
    heating the vessel and supplying heat through the hollow supporting tubes to vaporize the waste plastic and/or rubber whereby the waste plastic and/or rubber vapor flows through the fuel output tube; and
    cooling the waste plastic or rubber vapor to form a condensate.

12. The method of claim 11, further comprising the step of housing the vessel inside of a kiln.

* * * * *